(12) United States Patent
Stahr

(10) Patent No.: US 9,080,684 B2
(45) Date of Patent: Jul. 14, 2015

(54) SOLENOID DEVICE AND DRIVER ASSISTANCE DEVICE

(75) Inventor: Wolf Stahr, Abstatt (DE)

(73) Assignee: Robert Bosch GmbH, Stuttgart, DE (US)

( * ) Notice: Subject to any disclaimer, the term of this patent is extended or adjusted under 35 U.S.C. 154(b) by 0 days.

(21) Appl. No.: 13/880,856

(22) PCT Filed: Aug. 29, 2011

(86) PCT No.: PCT/EP2011/064805
§ 371 (c)(1),
(2), (4) Date: Sep. 16, 2013

(87) PCT Pub. No.: WO2012/055609
PCT Pub. Date: May 3, 2012

(65) Prior Publication Data
US 2014/0002217 A1    Jan. 2, 2014

(30) Foreign Application Priority Data

Oct. 25, 2010   (DE) .......................... 10 2010 042 845

(51) Int. Cl.
*H01F 7/08* (2006.01)
*F16K 31/06* (2006.01)
(Continued)

(52) U.S. Cl.
CPC ................. *F16K 31/06* (2013.01); *B60T 8/363* (2013.01); *H01F 7/081* (2013.01); *H01F 7/16* (2013.01)

(58) Field of Classification Search
CPC ................. H01H 51/065; H01H 9/465; H01H 2083/203; H01H 2071/086; H01H 2071/749
USPC ........................................................ 335/220
See application file for complete search history.

(56) References Cited

U.S. PATENT DOCUMENTS 1,352,307 A * 9/1920 Murphy ........................ 335/155
5,232,167 A * 8/1993 McCormick et al. ...... 239/585.5
(Continued)

FOREIGN PATENT DOCUMENTS

GB    2 258 702 A    2/1993
JP    10-12435 A     1/1998
(Continued)

OTHER PUBLICATIONS

International Search Report corresponding to PCT Application No. PCT/EP2011/064805, mailed Dec. 22, 2011 (German and English language document) (5 pages).

*Primary Examiner* — Shawki S Ismail
*Assistant Examiner* — Lisa Homza
(74) *Attorney, Agent, or Firm* — Maginot, Moore & Beck LLP

(57) ABSTRACT

A solenoid device includes a magnet armature and an armature counterpiece which is arranged at the end of the magnet armature. The magnet armature and the armature counterpiece are movable in relation to one another and an air gap is provided between a magnet armature end face and an armature counterpiece end face. The air gap creates a magnetic series path of the solenoid device. A disc is composed of a magnetizable material and is arranged in the air gap. The disc is configured to make physical contact with the magnetic armature end face and the armature counterpiece end face at least in regions. A magnetic shunt path is present when the magnetic armature and the armature counterpiece are in at least one position relative to one another. The magnetic shunt path runs across the disc at least in regions. The series path has a lower reluctance than the shunt path which runs across the disc when the magnet armature and the armature counterpiece are in the at least one position relative to one another.

11 Claims, 3 Drawing Sheets

(51) Int. Cl.
   *H01F 7/16*     (2006.01)
   *B60T 8/36*     (2006.01)

(56) References Cited

U.S. PATENT DOCUMENTS

| | | | | |
|---|---|---|---|---|
| 5,301,921 A | * | 4/1994 | Kumar | 251/129.08 |
| 5,407,174 A | * | 4/1995 | Kumar | 251/129.08 |
| 5,428,883 A | * | 7/1995 | Stieglitz | 29/602.1 |
| 6,050,542 A | | 4/2000 | Johnson et al. | 251/129.15 |
| 6,279,873 B1 | * | 8/2001 | Eichendorf et al. | 251/129.19 |
| 6,409,145 B1 | * | 6/2002 | Fong et al. | 251/129.18 |
| 6,644,623 B1 | * | 11/2003 | Voss et al. | 251/129.15 |
| 6,668,639 B2 | * | 12/2003 | Fong et al. | 73/161 |
| 6,776,391 B1 | * | 8/2004 | Goossens et al. | 251/129.15 |
| 6,789,779 B2 | * | 9/2004 | Wilde et al. | 251/129.15 |
| 6,837,478 B1 | * | 1/2005 | Goossens et al. | 251/129.15 |
| 6,846,049 B2 | * | 1/2005 | Obersteiner et al. | 303/119.2 |
| 6,953,183 B2 | * | 10/2005 | Uryu et al. | 251/129.08 |
| 7,163,188 B1 | * | 1/2007 | Sisk | 251/129.19 |
| 7,246,632 B2 | * | 7/2007 | Ohi et al. | 137/15.18 |
| 7,275,732 B2 | * | 10/2007 | Kato et al. | 251/129.15 |
| 7,289,878 B1 | * | 10/2007 | Estelle et al. | 700/233 |
| 7,458,395 B2 | * | 12/2008 | Haynes et al. | 137/625.65 |
| 7,866,627 B2 | * | 1/2011 | Ohi et al. | 251/129.07 |
| 8,123,193 B2 | * | 2/2012 | Kratzer | 251/129.18 |
| 8,448,916 B2 | * | 5/2013 | Kratzer | 251/129.18 |
| 8,517,336 B2 | * | 8/2013 | Kratzer | 251/129.18 |
| 2004/0089832 A1 | * | 5/2004 | Wilde et al. | 251/129.15 |

FOREIGN PATENT DOCUMENTS

| | | |
|---|---|---|
| JP | 2003-514708 A | 4/2003 |
| JP | 2004-288909 A | 10/2004 |
| WO | 01/36243 A1 | 5/2001 |

* cited by examiner

SOLENOID DEVICE AND DRIVER ASSISTANCE DEVICE

This application is a 35 U.S.C. §371 National Stage Application of PCT/EP2011/064805, filed on Aug. 29, 2011, which claims the benefit of priority to Serial No. DE 10 2010 042 845.0, filed on Oct. 25, 2010 in Germany, the disclosures of which are incorporated herein by reference in their entirety.

Cross reference is made to related U.S. application Ser. No. 13/880,089, entitled "Solenoid Valve, Braking System," which was filed on Jun. 20, 2013.

BACKGROUND

The disclosure relates to a solenoid device having a magnet armature and an armature counterpiece which is arranged at the end of the magnet armature, wherein the magnet armature and armature counterpiece can be moved in relation to one another, and an air gap, via which a magnetic series connection of the solenoid device is present, is provided between a magnet armature end and an armature counterpiece end.

Solenoid devices of the type mentioned at the beginning are known from the prior art. They may be embodied, for example, component of solenoid valves or in each case as a solenoid valve, wherein the solenoid valves can in turn be used for driver assistance devices, in particular ABS, TCS or ESP devices. The solenoid device has the magnet armature which can be moved in relation to the armature counterpiece. In this context, frequently only the magnet armature can be moved, while the armature counterpiece is arranged in a positionally fixed fashion. The armature counterpiece may be embodied, for example, as a pole core. In order to bring about the relative movement of the magnet armature and armature counterpiece, the two elements interact. For this purpose, for example the armature counterpiece has one or more coils, while the magnet armature is composed of a magnetizable or magnetic material. The armature counterpiece is provided at the end of the magnet armature. The magnet armature and the armature counterpiece are usually arranged with respect to one another in such a way that they cannot be connected to one another, irrespective of the movement of the magnet armature and armature counterpiece in relation to one another. Accordingly, between the magnet armature the armature counterpiece or the end of the magnet armature which faces the armature counterpiece and the end of the armature counterpiece which faces the magnet armature, that is to say the magnet armature end and the armature counterpiece end, there is a gap, referred to as the air gap or working air gap. The size of the air gap is dependent on the position of the magnet armature in relation to the armature counterpiece. The size of the air gap accordingly changes when the magnet armature and armature counterpiece move in relation to one another. The term air gap does not mean that the gap which is present between the magnet armature end the armature counterpiece end is actually filled with air. Instead, the gap can be filled with any desired media and serves only for spacing apart the magnet armature and the armature counterpiece.

The magnet armature and the armature counterpiece together form an actuating device. The magnetic force which can be generated by this actuating device and which implements the movement of the magnet armature and armature counterpiece in relation to one another is characterized by the size of the air gap. This means that the magnetic force is dependent on the size of the air gap, wherein as the air gap becomes smaller the magnetic force usually increases very strongly, usually exponentially. This strong increase as the air gap becomes smaller makes continuous adjustability or the proportionalization of the solenoid device more difficult.

It is known that this strong increase in the magnetic force can be at least partially remedied by enlarging the air gap. This is due to the fact that the actuating force or magnetic force which can be implemented with the solenoid device, and which ensures that the relative movement of the magnet armature and the armature counterpiece occurs, is involved/decreases exponentially as the air gap grows. The profile of the magnetic force plotted against the size of the air gap therefore becomes flatter as the air gap becomes larger, but is at the same time at a relatively low level. However, this low level of the magnetic force is problematic without the possibility of geometrically increasing relevant parts of the solenoid device, in particular the at least one coil. This applies, in particular, when the solenoid device is used for a solenoid valve which is closed in the currentless state. Here, the available magnetic force must be sufficiently large to open the solenoid valve counter to a compression spring which acts in a closing fashion. The compression spring is usually embodied in such a strong way that it even in a slightly prestressed state it can overcome the opening force brought about by the operating medium of the solenoid valve or by the pressure difference across the solenoid valve. A very stiff compression spring is also necessary as a result of the enlargement of the air gap because the gradients of the spring force and of the magnetic force plotted against the difference of the magnetic armature and armature counterpiece should be matched to one another. In this context, the gradient of the spring force is frequently selected to be larger than the gradient of the magnetic force.

A further possible way of at least partially eliminating the increase in the magnetic force is to implement what is referred to as an immersion stage. In this context, one region of the armature counterpiece engages at least in certain areas in a recess in the magnet armature as soon as the magnet armature undershoots a certain distance from the armature counterpiece. The implementation of such an immersion stage in a solenoid device is, however, complex because very precise guidance of the magnet armature with respect to the armature counterpiece is necessary in order to avoid impacting or contact between the magnet armature and the armature counterpiece, even in the region of the immersion stage and, in particular, in the radial direction. Such contact would lead to a significant reduction in the efficiency of the actuating device which is composed of the magnet armature and armature counterpiece. The precise guidance may be implemented, for example, by precisely fitting the magnet armature into a magnet armature guide, formed for example by a housing of the solenoid device. However, on the other hand, it must also be possible to move the magnet armature as easily as possible, that is to say without a large application of force. As a result, during the manufacture of the solenoid device very small tolerances have to be implemented in order, on the one hand, to permit the immersion stage and, on the other hand, to permit easy movement of the magnet armature. However, this results in high manufacturing costs.

SUMMARY

Accordingly, the solenoid device having the features specified in the description below has the advantage that a favorable magnetic force profile (magnetic force plotted against the size of the air gap or the distance between the magnet armature and the armature counterpiece) of the solenoid device is achieved with low manufacturing costs at the same time. A favorable magnetic force profile is to be understood in this context, in particular, as meaning a constant and continuous profile of the magnetic force plotted against the size of the air gap. These advantages are achieved according to the disclosure in that a disk which can be placed in contact at least in certain areas with the magnet armature end and the armature counterpiece end and is composed of a magnetizable material is arranged in the air gap, and in that a magnetic shunt connection which extends at least in certain areas over the disk is provided, in at least one position of the magnet armature and armature counterpiece with respect to one another, wherein in the at least one position of the magnet armature and armature counterpiece with respect to one another, preferably in every position, the series connection has a lower reluctance than the shunt connection which extends over the disk. Therefore, the air gap is not enlarged, as is known from the prior art, nor is an immersion stage, which gives rise to demanding tolerance requirements, provided. These measures can, however, of course be provided additionally. Viewed in the axial direction of this solenoid device, the disk is located between the magnet armature and the armature counterpiece. In other words, a disk which is in contact at least in certain areas and in at least one position of the magnet armature and armature counterpiece with the magnet armature end and/or the armature counterpiece end is arranged in the air gap.

The disk can have here a central recess or opening which serves, in particular, to accommodate a spring element of the solenoid device and/or an intermediate element which is provided for bringing about supporting contact with the armature counterpiece and is operatively connected on its side facing away from the armature counterpiece to a spring element. The spring element can be provided here for bringing about a spring force which counteracts the magnetic force which can be generated by means of the solenoid device. The spring element is usually provided to bring about the spring force in such a way that the magnet armature and the armature counterpiece are forced away from one another. The disk is preferably composed of a material, for example a metal, which can be satisfactorily magnetized, and is provided, in particular for transmitting the magnetic flux which is present in the air gap. If both the magnet armature end and the armature counterpiece end are in contact with the disk, in this case the magnetic shunt connection is present, which improves the actuation capability of the solenoid device. However, in this context the disk is to preferably apply a force which is as small as possible counter to the relative movement of the magnet armature and armature counterpiece with respect to one another. For this reason, the disk can ideally be deformed in the axial direction with a small application of force, that is to say has a small degree of rigidity in this direction. The disk is accordingly composed, in particular, of a flexurally soft material. Nevertheless, the disk is to be elastic to such an extent that that when the deforming force ceases the deformation is reversed, and the disk therefore provides the corresponding resetting force or has the corresponding elasticity.

In this context, in the at least one position of the magnet armature and armature counterpiece with respect to one another, preferably in every position, the series connection is to have a lower reluctance than the shunt connection which extends over or through the disk. The magnetic series connection of the solenoid device between the magnet armature and armature counterpiece is present beyond the air gap. In addition, it can also be present at least in certain areas and/or partially in the disk. In contrast, the shunt connection which extends over the disk is present (in particular to an appreciable degree) only if the disk is in contact both with the magnet armature end and the armature counterpiece end. At least in the at least one position of the magnet armature and armature counterpiece in which this is the case, the series connection is to have a lower reluctance, that is to say a lower magnetic resistance, than the shunt connection. The magnetic force which brings about the movement of the magnet armature and armature counterpiece in relation to one another is brought about by the series connection, and when the shunt connection is present it is supplemented thereby. If, accordingly, the disk is in contact both with the magnet armature end and the armature counterpiece end, the magnetic force is brought about jointly by the series connection and the shunt connection. Due to the lower reluctance of the series connection, that is to say the lower magnetic resistance, in this context the portion of the magnetic force which is brought about by the series connection is significantly larger than the portion which is brought about by the shunt connection. In this way, a magnetic force profile which is independent of tolerances and is constant or continuous is achieved. This is the case even if there is no provision for the contact between the disk and the magnet armature end and the armature counterpiece end to be present in every position of the magnet armature and armature counterpiece with respect to one another. Instead, it is possible to implement a solenoid device in which the disk is not in contact with the two ends in every position without having an excessive adverse effect on the profile of the magnetic force.

One development of the disclosure provides for the series connection to be present essentially in the axial direction, and/or for the shunt connection to be present essentially in the radial direction, at least in the region of the disk. The magnetic field lines of the series connection accordingly pass through the air gap in the axial direction, while the magnetic field lines of the shunt connection, at least insofar as they are present in the disk, extend in the radial direction.

One development of the disclosure provides that the magnet armature end and/or the armature counterpiece end are, at least in certain areas, concave, convex, in the shape of a cone or in the shape of a frustum. In principle, the magnet armature end and the armature counterpiece end can be configured in any desired way. However, they preferably have one of the specified shapes and are embodied here in opposite directions. The magnet armature end therefore forms, at least in certain areas, a counterpiece to a region of the armature counterpiece end, or vice versa. The magnet armature end extends, for example, parallel to the armature counterpiece end, with the result that the distance between them, that is to say the size of the air gap, is essentially the same at every point, viewed in the radial direction.

One development of the invention provides that the magnet armature end and/or the armature counterpiece end have, in order to reduce the reluctance of the series connection, at least one projection which protrudes toward the respective other end. In the region of the projection, the magnet armature end or the armature counterpiece end can deviate here from their actual shape with the result that they are no longer concave, convex, in the shape of a cone or in the shape of a frustum or the like. The reluctance is determined here by means of the relationship $$R_m = \frac{l}{\mu_0 \mu_r A}$$

where l is a length, in this case the distance between the magnet armature end and the armature counterpiece end, A is the corresponding cross section, $\mu_0$ is the magnetic field constant and $\mu_r$ is the relative permeability. Accordingly, with a reduction of the (maximum) distance, at least in certain areas, between the armature counterpiece end and magnet armature end it is possible to reduce the reluctance of the series connection. For this purpose, the at least one projection is provided which, starting from the magnet armature end or the armature counterpiece end protrudes toward the respective other end. In this way, the distance between the magnet armature end and the armature counterpiece end, and therefore the reluctance, are reduced at least in certain areas.

One development of the disclosure provides that the projection is arranged centrally and/or has a circular cross section. The projection is particularly preferably arranged centrally, that is to say in the middle, on the magnet armature end or the armature counterpiece end. In this way, inter alia, an ideal mass distribution of the magnet armature or of the armature counterpiece is achieved. If a plurality of projections are provided, a central arrangement is to be understood as being an arrangement in which the projections are arranged around a center point (for example the point of intersection of a longitudinal axis of the solenoid device with the magnet armature end or the armature counterpiece end). For example, the projection has a circular cross section, but any other shape can also be provided.

One development of the disclosure provides that the contact between the disk and the magnet armature end as well as the armature counterpiece end is present in every position of the magnet armature and armature counterpiece with respect to one another. The contact between the disk and the magnet armature and/or the armature counterpiece or the respective end is accordingly always present. The disk does not lift off from the magnet armature end or the armature counterpiece end in any position of the magnet armature and armature counterpiece. It is particularly advantageous if the disk is in contact both with the magnet armature end and the armature counterpiece end in every position. In this way a discontinuous profile of the magnetic force over various positions of the magnet armature and armature counterpiece with respect to one another is avoided. If, on the other hand, the contact occurs only at certain positions, a bending point or a discontinuity will occur in the profile of the magnetic force plotted against the size of the air gap.

This discontinuity is caused by the metallic contact which occurs, via which the actually desired magnetic shunt connection is present. Such a discontinuity is to be avoided. Its position would be dependent on tolerances of the solenoid device, and could therefore vary from one solenoid device to another and possibly also change during operation of the solenoid device. In terms of closed-loop or open-loop control technology it could therefore at best be dealt with by complex calibration, which is in turn costly.

However, it is to be expressly noted that a pre-stroke variant of the solenoid device, in which the contact is not present in every relative position of the magnet armature and armature counterpiece with respect to one another, can also readily be implemented. In such a pre-stroke variant, the magnet armature and armature counterpiece must firstly be moved toward one another by a certain distance before the contact comes about between the magnet armature, armature counterpiece and the disk. This embodiment is made possible, in particular, by the relatively low reluctance of the series connection with respect to the shunt connection. This relatively low reluctance has the effect that the magnetic force which is brought about by the series connection is always larger than that caused by the shunt connection. In this way, the discontinuity described above does not occur or occurs at least only in a greatly reduced form.

One development of the disclosure provides that the contact between the disk and the magnet armature end is present at at least a first contact point, and the contact between the disk and the armature counterpiece end is present at at least a second contact point, wherein the contact points are arranged differently in the radial direction, in particular are arranged in a non-overlapping fashion. In this context, the contact points can be present in a punctiform or planar fashion. It is only significant here that they are present at different positions in the radial direction. For example, the first contact point is provided at a first radial position, and the second contact point is provided at a second radial position which lies further outward, with respect to the first radial position. It is particularly advantageous here if the contact points do not overlap in the radial direction, that is to say are spaced apart from one another in the radial direction. For example, the at least one first contact point is located on a circle with a first radius, and the at least one second contact point is located on a circle with a second radius which is different from the first radius. The further the contact points are spaced apart from one another in the radial direction, the smaller the spring force applied by the spring disk to the magnet armature or the armature counterpiece when the magnet armature and armature counterpiece are moved toward one another.

One development of the disclosure provides that the solenoid device is a solenoid valve, wherein the magnet armature is operatively connected to a sealing element of the solenoid valve in order to move same. In this way, when the magnet armature is moved with respect to the armature counterpiece, the sealing element is also moved. The sealing element is usually provided for closing or opening a valve opening of the solenoid valve. If the sealing element is arranged in such a way as to close the valve opening, it is usually seated in a valve seat of the solenoid valve which is assigned both to the valve opening and to the sealing element. For example, the sealing element is placed in a recess in the magnet armature and secured therein, wherein the recess is preferably provided on a side of the magnet armature facing away from the armature counterpiece.

One development of the disclosure provides that the disk has an opening which has larger dimensions in the radial direction than the projection. In this respect, there is no overlap between the projection and the opening of the disk in the radial direction. The opening preferably extends through the disk completely in the axial direction. Said disk is provided, in particular, for accommodating in certain areas the spring element or the intermediate element.

Furthermore, the disclosure relates to a driver assistance device, in particular ABS, TCS or ESP device, having at least one solenoid device which is embodied as a solenoid valve, in particular according to the preceding embodiments, wherein the solenoid device has a magnet armature and an armature counterpiece which is arranged at the end of the magnet armature, wherein the magnet armature and the armature counterpiece can be moved in relation to one another, and an air gap, via which a magnetic series connection of the solenoid device is present, is provided between a magnet armature end and an armature counterpiece end. In this context there is provision that a disk which can be placed in contact at least in certain areas with the magnet armature end and the armature counterpiece end and is composed of a magnetizable material is arranged in the air gap, and in that a magnetic shunt connection which extends at least in certain areas over the disk is provided, in at least one position of the magnet armature and armature counterpiece with respect to one another, wherein in at least one position of the magnet armature and armature counterpiece with respect to one another, preferably in every position, the series connection has a lower reluctance than the shunt connection which extends over the disk. The solenoid device can be developed according to the embodiments above.

BRIEF DESCRIPTION OF THE DRAWINGS

The disclosure will be explained in more detail with reference to the exemplary embodiments illustrated in the drawing, without restriction to the disclosure. In this context.

DETAILED DESCRIPTION

Figure 1:
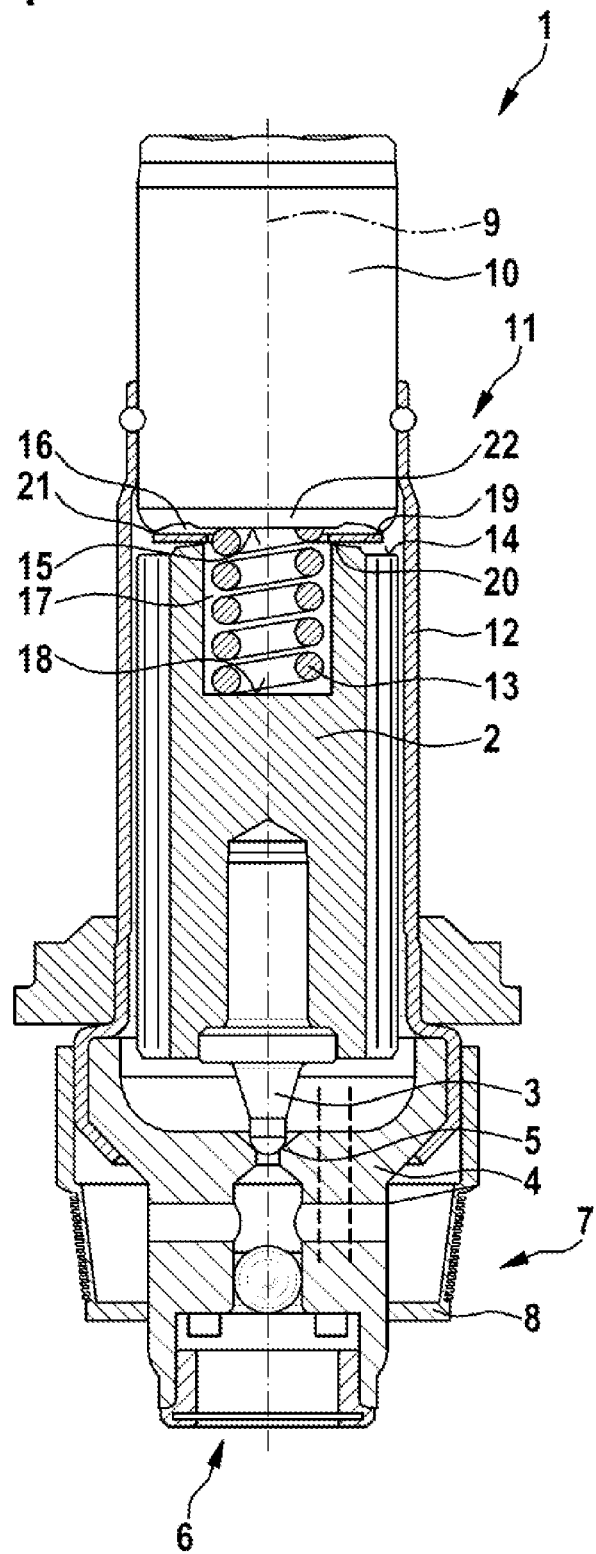
FIG. 1 shows a side sectional view of a solenoid device which is embodied as a solenoid valve and has a disk which is arranged between a magnet armature and an armature counterpiece.

FIG. 1 shows a solenoid device 1 which is embodied as a solenoid valve, wherein the solenoid valve is, for example, a component of a driver assistance device (not illustrated here). The solenoid device 1 has a magnet armature 2 which is operatively connected to a sealing element 3 of the solenoid valve. The sealing element 3 interacts with a valve seat 5 which is embodied in a valve body 4, in order to open or to interrupt a flow connection between an outlet port 6 and an inlet port 7 of the solenoid valve. The inlet port 7 is assigned a filter 8 in the exemplary embodiment illustrated here. Additionally or alternatively, it is, of course, also possible for the outlet port 6 to be assigned a filter (not illustrated here). The solenoid device 1 which is illustrated here is configured in accordance with the arrangement of the outlet port 6 and inlet port 7 for a radial inflow and an axial outflow (with respect to a longitudinal axis 9 of the solenoid device 1). However, it is, of course, possible for the inflow direction or the outflow direction to be provided as desired, that is to say for the outlet port 6 to be used as an inlet port, and for the inlet port 7 to be used as an outlet port.

In addition to the magnet armature 2, the solenoid device 1 has an armature counterpiece 10 which forms, together with the magnet armature 2, an actuating device 11 of the solenoid device 1. The armature counterpiece 10 is embodied, for example, as a pole core and has at least one electric coil, with the result that a magnetic force can be applied to the magnet armature 2 by means of the armature counterpiece 10 by applying a voltage to the coil (that is to say by energizing the solenoid device 1). The magnet armature 2 is mounted in an axially slidable fashion with respect to the longitudinal axis 9, wherein the bearing is implemented, in particular, by means of a housing 12 of the solenoid device 1. The armature counterpiece 10 and the valve body 4 are also secured in a positionally fixed fashion here on the housing 12. The magnet armature 2 can therefore be moved in the axial direction in relation to the magnet armature 2 or the valve body 4, under the influence of the magnetic force generated by means of the armature counterpiece 10. The solenoid valve, which is illustrated in FIG. 1, is a solenoid valve which is closed in the currentless state. This means that the sealing element 3 is seated in a seal-forming fashion in the valve seat 5 as long as the solenoid valve is not energized, that is to say no magnetic force is generated by means of the armature counterpiece 10.

A spring element 13 is arranged between the magnet armature 2 and the armature counterpiece 10. The spring element 13 engages through an air gap 16 which is bounded in the axial direction by a magnet armature end 14 and an armature counterpiece end 15. The spring element 13 is supported in the exemplary embodiment illustrated here on the armature counterpiece end 15. On its side facing away from the armature counterpiece 10, it is seated in certain areas in a recess 17 in the armature counterpiece 10, which recess is embodied as a central drilled hole. In this context, the spring element 13 is supported on a base 18 of the recess 17. The spring element 13 brings about a spring force which acts between the magnet armature 2 and the armature counterpiece 10. Because the armature counterpiece 10 is arranged in a positionally fixed fashion, this spring force forces the magnet armature 2 and therefore also the sealing element 3 in the direction of the valve seat 5. If the solenoid valve is energized, the corresponding magnetic force which is directed in the direction of the armature counterpiece 10 in the exemplary embodiment illustrated here therefore acts on the magnet armature 2, and the magnet armature 2 is therefore moved toward the armature counterpiece 10. In this context, the magnetic force which is brought about is firstly greater than the spring force of the spring element 13. Due to the movement of the magnet armature 2, the spring element 13 is relieved of stress further and the spring force accordingly increases. If the magnetic force is eliminated, the spring force causes the magnet armature 2 to be forced away from the armature counterpiece 10 again.

In order to improve the actuation capability of the solenoid valve, a disk 19 is arranged in the air gap 16, which is present between the magnet armature 2 and the armature counterpiece 10 or between the magnet armature end 14 and the armature counterpiece end 15, in such a way that said disk 19 can be placed in contact, at least in certain areas, with the magnet armature end 14 and the armature counterpiece end 15. In the case of the solenoid valve illustrated in FIG. 1, there is provision that the contact is present in any relative position or position of the magnet armature 2 and armature counterpiece 10 with respect to one another. Alternatively, it can also be embodied in such a way that the contact is present only in one position or in a number of positions.

The magnet armature end 14 is of convex configuration at least in certain areas, that is to say curves in the direction of the armature counterpiece 10. In contrast, the armature counterpiece end 15 is of concave configuration at least in certain areas, that is to say has an inwardly directed curvature. The contact between the magnet armature end 14 of the disk 19 is present at a first contact point 20. A second contact point 21, between which there is contact between the armature counterpiece end 15 and the disk 19, is provided further on the outside in the radial direction than the first contact point 20. The contact points 20 and 21 are spaced apart from one another in the radial direction here, with the result that there is no overlap between them.

A magnetic series connection of the solenoid device 1 is present across the air gap 16. In addition to this series connection, a magnetic shunt connection which extends at least in certain areas over the disk 19 is provided in at least one position of the magnet armature 2 and the armature counterpiece 10 with respect to one another. The shunt connection is present here if the disk 19 is in contact both with the magnet armature end 14 and with the armature counterpiece end 15. The shunt connection is accordingly present via the first contact point 20, the disk 19 and the second contact point 21. In this context, magnetic field lines of the series connection extend essentially in the axial direction between the magnet armature 2 and the armature counterpiece 10. In contrast, the magnetic field lines of the shunt connection extend in the radial direction at least in the region of the disk 19. In order to achieve a better actuation capability of the solenoid device 1, the series connection in the at least one position of the magnet armature 2 and the armature counterpiece 10 with respect to one another has a lower reluctance than the shunt connection. This is achieved essentially by corresponding adaptation of the magnet armature end 14 and/or of the armature counterpiece end 15. In the embodiment here, the armature counterpiece end 15 has a projection 22 which protrudes toward the magnet armature end 14. In this respect, in the region of the projection 22, the armature counterpiece end 15 deviates from its concave configuration. The projection 22 is provided centrally on the armature counterpiece end 15. Said projection 22 can have a circular cross section, but alternatively other cross-sectional shapes are also possible. The projection 22 brings about, at least in certain areas, a reduction in the distance between the magnet armature end 14 and the armature counterpiece end 15. In this way, the portion of the magnetic force which is brought about by the series connection is increased in the region of the projection 22. In contrast to this, the portion of the magnetic force which is brought about by the shunt connection is small.

Figure 2:
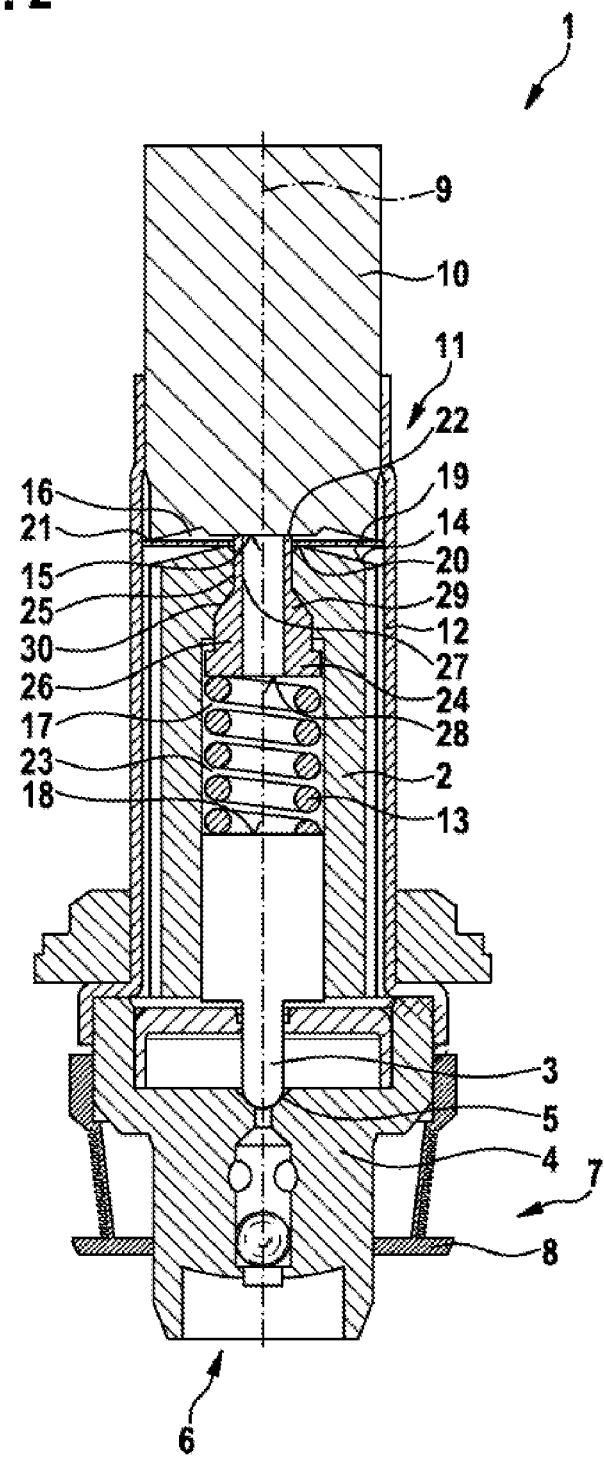
FIG. 2 shows the solenoid device in a second embodiment and FIG. 3 shows a sectional view of a detail of the solenoid device known from FIG. 2, in the region of the disk.

FIG. 2 shows a further embodiment of the solenoid device 1. Basically, the exemplary embodiment in FIG. 2 corresponds to that shown in FIG. 1, with the result that in this respect reference is basically made to the embodiments above. However, in the case of the exemplary embodiment shown here, an intermediate element 24 is arranged in a guide recess 23 in the magnet armature 2 in order to improve the adjustment capability during the manufacture of the solenoid device 1. The guide recess 23 is formed here essentially by the recess 17. The intermediate element 24 is mounted in an axially movable fashion and can enter into supporting contact with the armature counterpiece 10. In addition to the guide recess 23, the magnet armature 2 has a through-opening 25, wherein the guide recess 23 and the through-opening 25 are preferably both formed by the recess 17 which can be embodied as a stepped drilled hole. The through-opening 25 has a smaller cross section than the guide recess 23, in particular therefore a smaller diameter. At the same time, the intermediate element 24 is composed of a guide section 26 and a passage section 27. The guide section 26 is arranged in the guide recess 23, while the passage section 27 is present in certain areas in the through-opening 25. The guide section 26 has here a relatively large cross section, in particular a larger diameter than the passage section 27. In this respect, an end stop for the intermediate element 24 is formed in the magnet armature 2. The end stop prevents the intermediate element 24 from being able to move out of the magnet armature 2 or the recess 17 in the direction of the armature counterpiece 10. As a result of the relatively small dimensions of the passage section 27 compared to the guide section 26, virtually the entire pole face (in the form of the surface of the armature counterpiece end 15) is available for transmitting the magnetic force.

On the side of the magnet armature 2 facing away from the intermediate element 24, the sealing element 3 is pressed into the recess 17 with the result that it is held therein in a clamping fashion. The sealing element 3 has, on its side facing away from the valve seat 5, a supporting face which forms the base 18 of the recess 17. The spring element 13 is in turn supported on this base 18. The spring element 13 is arranged here between the sealing element 3 and the intermediate element 24. The latter has a bearing face 28 for the spring element 13. In the embodiment of the solenoid device 1 illustrated here, prestress of the spring element 13, which is embodied, for example, as a helical spring, can be set by pressing the sealing element 3 into the magnet armature 2. In the region of the through-opening 25, through which the intermediate element 24 engages, the dimensions of the through-opening 22 are reduced, in particular adapted to the dimensions of the intermediate element 24, in such a way that a radial guiding means for the latter is formed.

The spring element 13 brings about a spring force which acts on the intermediate element 24, wherein said spring element 13 is supported on the sealing element 3 which is arranged in a positionally fixed fashion with respect to the magnet armature 2. If the solenoid device 1 is energized, the corresponding magnetic force, which is directed in the direction of the armature counterpiece 10 in the exemplary embodiment illustrated here, therefore acts on the magnet armature 2, and the magnet armature 2 is therefore moved toward the armature counterpiece 10. As soon as the magnet armature 2 has reached a position with respect to the armature counterpiece 10 in which the intermediate element 24 is in contact or supporting contact with the armature counterpiece 10, the intermediate element 24 is moved into the guide recess 23, that is to say toward the sealing element 3. In this context, the spring element 13 is stressed. If the magnetic force is eliminated, the spring force causes the magnet armature 2 to be forced away from the armature counterpiece 10 again. In the embodiment proposed here, the resetting of the magnet armature 2 is therefore implemented by means of the intermediate element 24, wherein the intermediate element 24 is constantly in supporting contact with the armature counterpiece 10. However, it is also possible to provide that a further spring element (not illustrated here) is used for resetting. In particular in this case, the intermediate element 24 can be spaced apart from the armature counterpiece 10 in at least one position of the magnet armature 2, and can enter into supporting contact with the armature counterpiece 10 again only when the magnet armature 2 and the armature counterpiece 10 move toward one another.

FIG. 2 also shows that the intermediate element 24 is of conical configuration at least in certain areas, that is to say has a conical region 29. The latter is located in the guide section 26 and serves, in particular, for reducing the dimensions to the dimensions present in the passage section 27. At the same time, the guide recess 23 has, on its side facing the passage opening 25, a region 30 with a reduced cross section. The latter is preferably also of conical configuration, at least in certain areas, preferably completely of conical configuration. A cone is understood here to be a cone or a frustum, particularly preferably a circular cone or a circular cone frustum. The solenoid device 1 is preferably embodied in such a way that in at least one position of the magnet armature 2 and armature counterpiece 10 with respect to one another the conical region 29 of the intermediate element 24 is arranged at least in certain areas in the region 30 with a reduced cross section. In this position, said conical region 29 is preferably in contact with a wall of the region 30 with a reduced cross section. Due to the conical shape of the intermediate element 24 and region 30 with a reduced cross section, this contact brings about centering of the intermediate element 24 with respect to the magnet armature 2. In this respect, centering contact is present between the intermediate element 24 and the magnet armature 2. In addition, as a result of the interaction of the intermediate element 24 with the region 30 with a reduced cross section it is possible to implement an end stop for the intermediate element 24 which prevents the intermediate element 24 from moving out of the recess 17 in the direction of the armature counterpiece 10.

Figure 3:
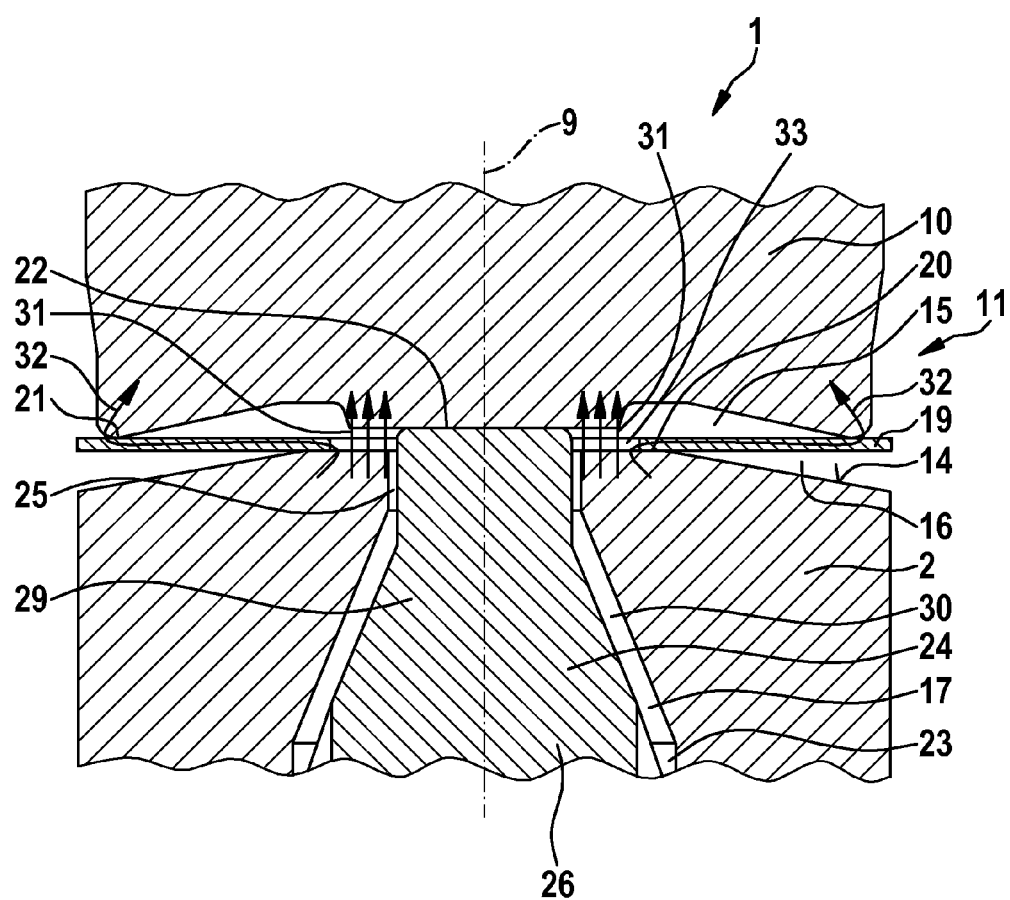

FIG. 3 shows a sectional view of a detail of the solenoid device 1 which is known from FIG. 2. In this respect, reference is made to the statements above. FIG. 3 shows the series connection by means of arrows 31, and the shunt connection by means of arrows 32. It becomes clear once more that the armature counterpiece end 15 is concave at least in certain areas, but the projection 22 which is arranged centrally, with respect to the longitudinal axis 9, is provided, said projection 22 protruding toward the magnet armature 2. The disk 19 has an opening 33. The latter is preferably embodied with dimensions which are larger in the radial direction than the projection 22. When the magnet armature 2 and armature counterpiece 10 move toward one another, it is accordingly impossible for contact to occur between the projection 22 and the disk 19.

The invention claimed is:

1. A solenoid device comprising:
   a magnet armature;
   an armature counterpiece arranged at an end of the magnet armature, the magnet armature and the armature counterpiece being configured to move in relation to one another;
   an air gap defined between the magnet armature end and an armature counterpiece end, through which a magnetic series connection is established between the magnet armature and the armature counterpiece; and
   a disk configured to contact at least certain areas of both the magnet armature end and the armature counterpiece end at every position of the magnet armature relative to the armature counterpiece, the disk being composed of a magnetizable material and arranged in the air gap,
   wherein a magnetic shunt connection is established through at least certain areas of the disk at every position of the magnet armature relative to the armature counterpiece, and
   wherein the magnetic series connection has a lower reluctance than the shunt connection.

2. The solenoid device as claimed in claim 1, wherein the series connection is directed essentially in an axial direction, and the shunt connection is directed essentially in a radial direction, at least in a region of the disk.

3. The solenoid device as claimed in claim 1, wherein at least one of the magnet armature end and the armature counterpiece end are, at least in certain areas, one of concave, convex, in the shape of a cone and in the shape of a frustum.

4. The solenoid device as claimed in claim 1, wherein one of the magnet armature end and the armature counterpiece end has at least one projection configured to protrude toward an other of the magnet armature end and the armature counterpiece end, the projection being configured to reduce a reluctance of the series connection.

5. The solenoid device as claimed in claim 4, wherein the at least one projection is arranged centrally on the one of the magnet armature and the armature counterpiece and has a circular cross section.

6. The solenoid device as claimed in claim 4, wherein the disk has an opening with larger dimensions in a radial direction than the at least one projection.

7. The solenoid device as claimed in claim 4, wherein the projection has a base having a first diameter, and the disk defines a central opening having a greater diameter than the first diameter such that the spring element does not contact the projection at an any position of the magnet armature relative to the armature counterpiece.

8. The solenoid device as claimed in claim 1, wherein:
   contact between the disk and the magnet armature end is present at at least a first contact point,
   contact between the disk and the armature counterpiece end is present at at least a second contact point, and
   the first contact point and the second contact point are arranged differently in a radial direction.

9. The solenoid device as claimed in claim 1, wherein:
   the solenoid device is a solenoid valve, and
   the magnet armature is operatively connected to a sealing element of the solenoid valve to move the solenoid valve.

10. The solenoid device as claimed in claim 1, further comprising:
    an intermediate element including a first portion extending through a through opening defined in one of the magnet armature and the armature counterpiece, the first portion being configured to contact the armature counterpiece end,
    wherein the magnetic series connection is established through an annular region between the first portion and the disk.

11. A driver assistance device, comprising:
    at least one solenoid device in the form of a solenoid valve, including:
    a magnet armature;
    an armature counterpiece arranged at an end of the magnet armature, the magnet armature and the armature counterpiece being configured to move in relation to one another;
    an air gap defined between the magnet armature end and an armature counterpiece end, through which a magnetic series connection is established between the magnet armature and the armature counterpiece; and
    a disk configured to contact at least certain areas of both the magnet armature end and the armature counterpiece end at every position of the magnet armature relative to the armature counterpiece, the disk being composed of a magnetizable material and arranged in the air gap,
    wherein a magnetic shunt connection is established through at least certain areas of the disk at every position of the magnet armature relative to the armature counterpiece, and
    wherein the magnetic series connection has a lower reluctance than the shunt connection.

* * * * *